United States Patent
Gyöngyösi

(10) Patent No.: US 6,918,161 B2
(45) Date of Patent: Jul. 19, 2005

(54) HOSE CLAMP FOR CLAMPING A HOSE ON A PIPE BY MEANS OF A SPRING BAND WHOSE END SECTIONS IN THE SPREAD-APART STATE ARE LOCKABLE AND A RELEASE DEVICE FOR THE HOSE CLAMP

(75) Inventor: Jürgen Gyöngyösi, Hanau (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/441,133

(22) Filed: May 15, 2003

(65) Prior Publication Data

US 2003/0217440 A1 Nov. 27, 2003

(30) Foreign Application Priority Data

May 23, 2002 (DE) .......................... 102 22 732

(51) Int. Cl.[7] .............................................. B65D 63/00
(52) U.S. Cl. ........................ 24/20 S; 24/20 R; 285/23
(58) Field of Search .................... 24/20 TT, 20 EE, 24/20 R, 20 S, 20 CW, 303, 456, 551; 285/23

(56) References Cited

U.S. PATENT DOCUMENTS

| | | | | |
|---|---|---|---|---|
| 983,093 A | * | 1/1911 | Svenson | 24/20 EE |
| 3,495,306 A | * | 2/1970 | Eichberg | 24/20 TT |
| 3,540,224 A | * | 11/1970 | Pogonowski | 24/20 TT |
| 4,425,681 A | | 1/1984 | Ilius | |
| 4,611,377 A | | 9/1986 | McCormick et al. | |
| 4,773,129 A | * | 9/1988 | Muhr | 24/20 R |
| 4,858,279 A | * | 8/1989 | Kato et al. | 24/20 R |
| 4,872,242 A | * | 10/1989 | Allan | 24/20 EE |
| 4,930,192 A | * | 6/1990 | Muhr | 24/20 R |
| 5,203,809 A | | 4/1993 | Oetiker | |
| 5,414,905 A | * | 5/1995 | Kimura et al. | 24/20 R |
| 5,855,044 A | * | 1/1999 | Cradduck | 24/20 R |
| 5,864,926 A | | 2/1999 | Gyöngyösi et al. | |
| 5,996,186 A | * | 12/1999 | Yamada et al. | 24/20 R |
| 6,314,631 B1 | | 11/2001 | Pryor | |
| 6,343,407 B1 | * | 2/2002 | Muto et al. | 24/20 R |

FOREIGN PATENT DOCUMENTS

| | | |
|---|---|---|
| DE | 1750722 | 5/1971 |
| DE | 8700695 | 6/1987 |
| DE | 4243848 | 6/1994 |
| DE | 295 20 342 U1 | 3/1996 |
| DE | 196 41 108 C1 | 1/1998 |
| EP | 0174410 | 3/1986 |
| WO | 0154859 | 8/2001 |

* cited by examiner

Primary Examiner—Jack W. Lavinder
(74) Attorney, Agent, or Firm—Friedrich Kueffner

(57) ABSTRACT

A hose clamp for clamping a hose on a pipe has a spring band bent to a ring-shape and end sections that positively lock one another in a locking position when the spring band is in a spread-apart position widened past a nominal diameter of a hose against a spring force of the spring band. The locking position of the end sections is releasable such that the spring band contracts about the hose. The end sections are positioned laterally adjacent to one another in an axial direction of the hose clamp and have a first edge and a second edge facing one another in the axial direction of the hose clamp. The first and second edges have at least one laterally projecting tooth, respectively.

10 Claims, 4 Drawing Sheets

US 6,918,161 B2

HOSE CLAMP FOR CLAMPING A HOSE ON A PIPE BY MEANS OF A SPRING BAND WHOSE END SECTIONS IN THE SPREAD-APART STATE ARE LOCKABLE AND A RELEASE DEVICE FOR THE HOSE CLAMP

BACKGROUND OF THE INVENTION

1. Field of the Invention

The invention relates to a hose clamp for clamping a hose on a pipe or the like, comprising a spring band bent to a ring shape whose end sections, in a position of the hose clamp spread apart against the spring force of the spring band past the nominal diameter of the hose, can be locked relative to one another, wherein this locking position can be released so that the spring band contracts tightly about the hose. Moreover, the invention relates to a device for releasing the hose clamp.

2. Description of the Related Art

Such a hose clamp is also referred to as "spring band clamp" and is known, for example, from U.S. Pat. No. 5,414,905 or U.S. Pat. No. 5,864,926. Here, one end section is guided through a slot in the other end section of the spring band, wherein both end sections are provided with radially projecting clamping jaws. In the locked state, a hook provided on one end section or a tab provided on one end section engages behind the clamping jaw of the other end section. The clamping jaws project however relatively far past the periphery of the clamp. Such clamping jaws require a lot of material, present an obstruction, and can cause injuries. In the case of clamping jaws that are shorter or more flat, as they are known, for example, from U.S. Pat. No. 4,425,681 or U.S. Pat. No. 5,203,809, there is the risk of a self-actuated release of the spread-apart clamp so that it can be thrown off at high speed and can cause injuries to persons before it has been slipped onto the hose to be clamped.

Moreover, spring band clamps are commercially available whose end sections are positioned laterally adjacent to one another and have no radially projecting clamping jaws. However, they cannot be locked in the spread-apart state.

In all known cases in which the spring band clamp can be locked in the spread-apart state, locking is possible only for a predetermined nominal diameter to which the clamp can be widened.

SUMMARY OF THE INVENTION

It is an object of the present invention to provide a clamp of the aforementioned kind which has no radially projecting clamping jaws on the end sections and can be locked at different spread-apart diameters. Moreover, a device is to be provided which enables a risk-free release of the spread-apart, locked clamp.

In accordance with the present invention, this is achieved in that the end sections are positioned laterally adjacent to one another and are provided at their edges facing one another in the axial direction of the clamp with at least one laterally projecting tooth, respectively, for producing the positive-locking action.

According to this solution, no clamping jaws are required for locking the spread-apart clamp. They are no longer necessary. Clamping, instead, can be realized by a simple tool, for example, a pair of pliers which engages the free ends of the spring band.

In the spread-apart position of the spring band, it is possible to ensure that each tooth of one edge is brought into engagement with a tooth of the other edge, respectively. The engagement is realized preferably in that the end sections, while the clamp is secured in the spread-apart position by the tool, are bent axially toward one another, without causing a permanent deformation, until the rows of teeth are brought into engagement at the desired spread-apart diameter of the spring band determined by the tool. In this way, in the case of a configuration having a row of teeth on each one of the two edges, it is possible to adjust widening of the spring band to different hose diameters so that one and the same hose clamp can be used for different hose diameters; it is no longer required to manufacture and store for each hose diameter a different hose clamp, respectively, lockable in the spread-apart position for the required diameter of the hose.

Preferably, the teeth, in a radial view of the hose clamp, are approximately triangular. The rows of teeth can then be easily brought into engagement.

Also, the teeth can be slanted toward the respective free ends of the spring band. This increases the safety of the securing action of the teeth which are engaging one another because they can engage one another from behind.

In addition, the teeth can be bent in the radial direction of the hose clamp so that they project partially past the annular circumference of the spring band. The edges and corners of the teeth or rows of teeth engaging one another can then engage the facing flank(s) of the tooth or teeth of the other end section. This makes a radial accidental spreading apart of the end sections more difficult.

As an alternative to the triangular shape of the teeth, it is also possible to configure the teeth, in a radial view of the hose clamp, to have a rectangular shape. The teeth are then relatively highly loadable even for greater diameters of the spread-apart position in which they are in engagement.

As an alternative, it is also possible not to engage the teeth of the end sections in the spread-apart state of the hose clamps; instead, the end sections are secured in the spread-apart position of the spring band by a connecting member which has three parallel legs of which one leg engages the opposed tooth gaps and the two others rest against an axially outer rim of the end sections, respectively. In this connection, the end sections must not be bent toward one another for maintaining the mutual engagement of the teeth.

The connecting member can then have a grip with which it can be disengaged for releasing the spread-apart clamp comprising the spring band.

The grip is preferably annular or ring-shaped so that it can be easily gripped.

The device according to the invention for releasing the spread-apart clamp with rows of teeth being in engagement, can be lockable, preferably magnetically, on one end section and can comprise a slide, which is actuated preferably electro-magnetically, as well as two presence sensors, wherein the slide, when the release device is attached to one end section, engages in a slidable fashion the other end section in a radial direction of the clamp and wherein the detection range of the presence sensors is located adjacent to the axially outer edges of the end sections and the movement of the slide, upon determining the presence of a hose in the hose clamp by means of the two presence sensors, can be released be a certain amount by entraining the other end section of the spring band, wherein upon reaching this amount, the teeth of the end sections are moved radially out of engagement.

In principle, it is possible to carry out the release by means of a simple screwdriver whose blade is moved into the area of the end sections that are not engaging one another, and the screw driver is then rotated. The above described device however has the advantage that it enables the self-release only when the clamp is in the spread-apart state and pre-mounted about a hose. As long as the hose clamp is not arranged about a hose, but is in the spread-part and locked state away from the hose and the presence sensors therefore do not detect an object about which the hose clamp is arranged, the hose clamp cannot be released. It cannot be accidentally opened and cannot be thrown off as a result of the reactive force caused by snapping into place and cannot injure a person.

DESCRIPTION OF THE PREFERRED EMBODIMENTS

Figure 1:
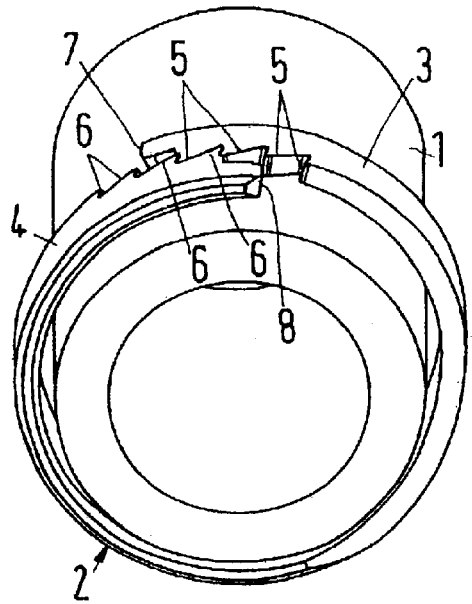
FIG. 1 shows a hose with a hose clamp according to the invention surrounding it in the spread-apart and locked state.
Figure 2:
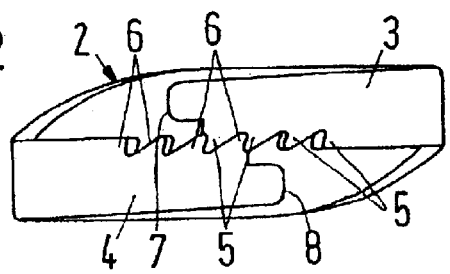
FIG. 2 shows a radial view onto the hose clamp of FIG. 1.
Figure 3:
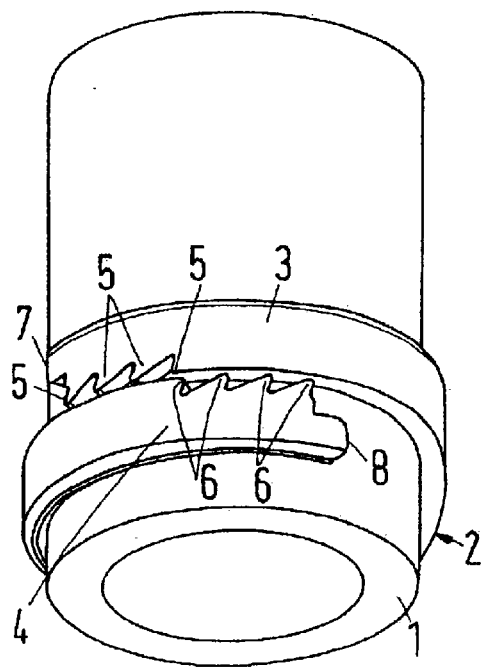
FIG. 3 shows a radial view of the hose clamp of FIG. 1 in the released state clamped onto the hose.

The hose clamp according to FIGS. 1 through 3 serves for securing a hose 1 on a pipe (not illustrated) or the like. It is comprised of an annularly shaped spring band 2 whose end sections 3 and 4 are lockable in a positive-locking way in a position of the hose clamp, according to FIG. 1, in which the hose clamp is spread apart against the spring force of the spring band past the nominal diameter of the hose. The locking position at the locking device is releasable so that the spring band 2 will tighten or contract about the hose 1. The end sections 3 and 4 are positioned laterally adjacent to one another and are provided with a row of laterally projecting teeth 5, 6 at their edges, respectively, facing one another in the axial direction of the hose clamp for producing the positive-locking action. In the illustrated embodiment, each row has four teeth 5 and 6, respectively.

In the spread-apart position of the spring band 2 according to FIG. 1 and FIG. 2, two teeth 5 of one row are engaged by two teeth 6 of the other row. In the radial view of the hose clamp, the teeth 5, 6 are triangular. Moreover, they are slanted toward the free ends 7 and 8 of their end sections 3 and 4, respectively.

Figure 4:
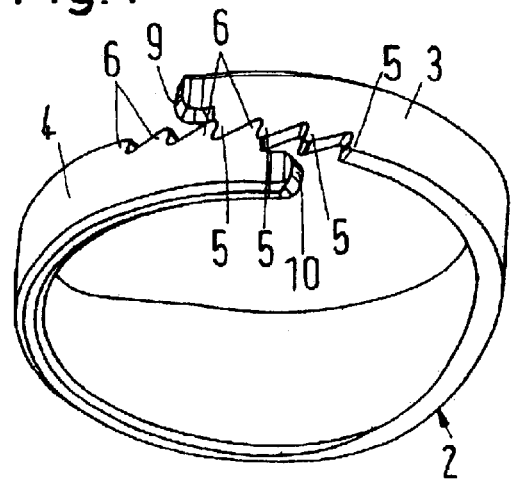
FIG. 4 shows a slightly modified embodiment of the hose clamp according to FIGS. 1 through 3, in which the free ends are bent slightly radially outwardly.
Figure 5:
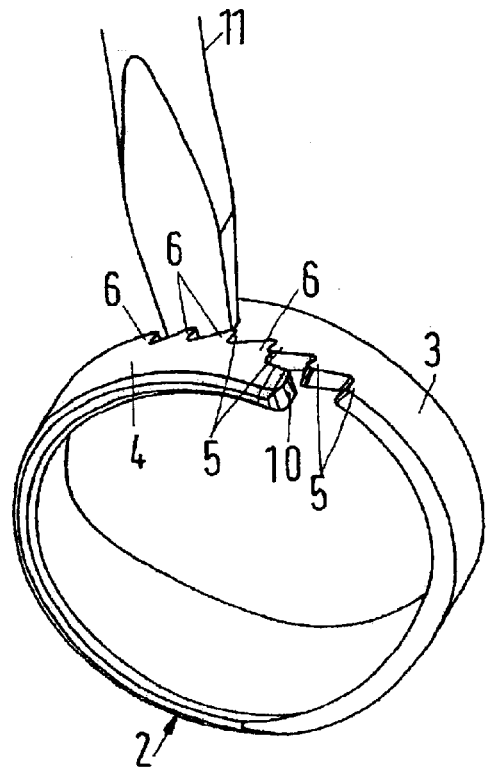
FIG. 5 shows one example of a release action of a hose clamp locked in the spread-apart state by means of a screwdriver.

In FIGS. 4 and 5, a modification relative to the embodiment of FIGS. 1 through 3 of a hose clamp according to the invention is illustrated in which the free ends 9 and 10 of the end sections 3 and 4 are slightly radially outwardly bent so that they can slide somewhat easier on the hose when the hose clamp, after locking, contracts tightly about the hose, as illustrated, for example, in FIG. 3, from its spread-apart position, as illustrated, for example, in FIGS. 1, 2, 4 and 5, as a result of its spring tension which it exhibits in its spread-apart position.

The release can be realized, for example, by means of a screwdriver 11 whose blade according to FIG. 5 is moved between the end sections 3 and 4 into a position adjacent to an edge area, in which one or the other end section 3, 4 has no teeth and is therefore somewhat smaller, and the screwdriver 11 then rotated.

Figure 6:
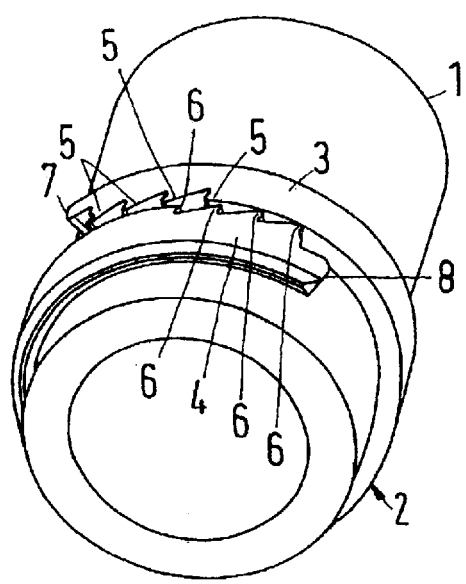
FIG. 6 is a view similar to that of FIG. 3, wherein the hose clamp in the released state is tightly contracted about a hose with a small diameter.
Figure 7:
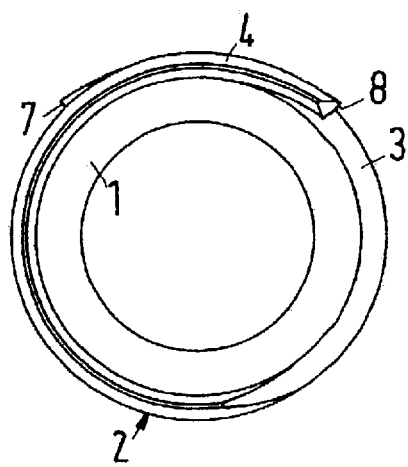
FIG. 7 is an axial view of the arrangement according to FIG. 6.

FIGS. 6 and 7 illustrate the position of a spring band 2 which is, for example, designed for a hose diameter range of 25 to 27 mm when the hose 1 has the smallest diameter of 25 mm of the nominal diameter range of the hose clamp. In this situation, the spring band 2, with the exception of its ends 7 and 8 which are projecting slightly radially outwardly, rests circularly against the circumference of the hose 1.

Figure 8:
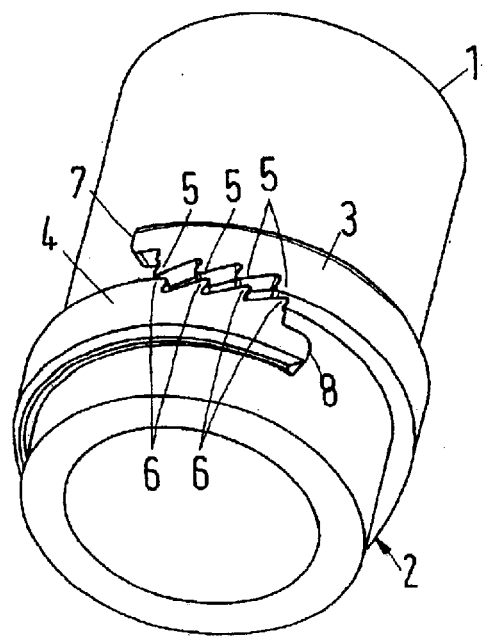
FIG. 8 is a view of the hose clamp according to the invention in the released state in which it is tightly contracted about the periphery of a hose of a larger diameter.
Figure 9:
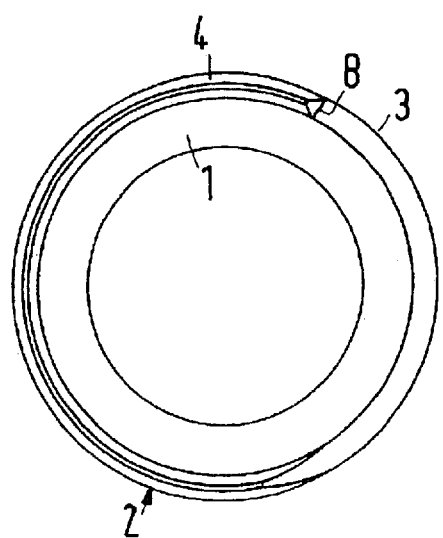
FIG. 9 is an axial view of the arrangement of FIG. 8.

FIGS. 8 and 9 illustrate the position of the same spring band 2, configured for a hose diameter range of 25 to 27 mm, for the greatest diameter of the hose 1 of 27 mm in the released state in which the spring band 2 rests tightly against the periphery of the hose 1. In this situation, the ends 7 and 8 of the spring band 2 also rest against the periphery of the hose 1.

For an intermediate size of the hose 1 of 26 mm, a corresponding intermediate position between the positions of FIGS. 6 and 7, on the one hand, and FIGS. 8 and 9, on the other hand, results.

The hose clamp can therefore be locked in different opening widths, corresponding to the respective diameter of the hose 1 onto which the clamp is to be slipped, and can then be released so that the spring band 2 tightens securely about the hose 1 and secures or clamps the hose 1 on the respective pipe or the like.

However, it is also possible to employ the hose clamp in the same way as prior art hose clamps which cannot be locked in the spread-apart state, i.e., the teeth 5, 6 are not brought into engagement with one another in the spread-apart position.

Figure 10:
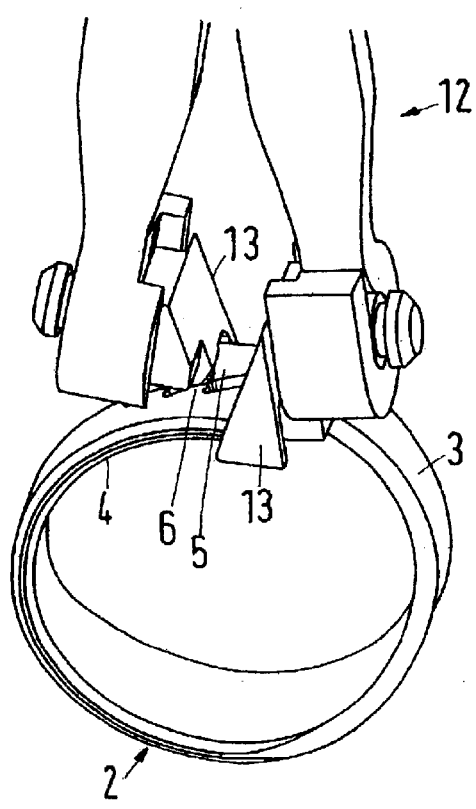
FIG. 10 shows clamping of a hose clamp according to the invention by means of a special tool.

Spreading apart the spring band 2 can be realized by means of a conventional pair of pliers or, according to FIG. 10, with special pliers 12. The special tool or pliers 12 has clamping jaws 13 in which the tooth-free band areas of the end sections 3, 4 of the spring band 2 adjoining the ends 7 and 8 or 9 and 10 are received and, upon closing of the pliers 12, are entrained in the circumferential direction of the spring band 2 until the maximum desired diameter of the spring band 2 is reached. When one or several teeth of one of the rows of teeth is positioned opposite one or several tooth gaps of the other row of teeth in the spread-apart position, the end sections 3, 4 are axially bend toward one another so that the teeth of the two rows of teeth engage one another and, upon removal of the pair of pliers 12, lock one another as a result of the spring force of the spring band acting in the closing direction and as a result of the undercuts of the teeth 5 and 6 so that they maintain the locking position illustrated, for example, in FIGS. 1, 2, 4, and 5.

Preferably, the tooth-free band areas when spreading apart the hose clamp are received in a groove of the corresponding clamping jaw 13, respectively, but the axially inner wall of the respective groove has a spacing from the teeth 6 and 5 of the oppositely positioned end section 4 or 3 so that the teeth 5 and 6, as a result of the corresponding play of the legs of the pliers, can be brought into engagement by bending the end sections.

The clamping jaws 13 delimit the spread-apart diameter in that, when spreading apart the hose clamp, they contact one another by contact surfaces located adjacent to the inner groove wall, respectively. Moreover, the clamping jaws 13 can be exchanged for clamping jaws whose contact surfaces in the circumferential direction are displaced forwardly or rearwardly in order to achieve a correspondingly enlarged or decreased spreading-apart diameter so that other teeth 5 and 6 can be brought into engagement with one another. For this purpose, the clamping jaws 13 are non-rotatably secured in receptacles, on the one hand, and, on the other hand, are secured detachably by means of pins in openings of the legs of the pliers with securing rings, not illustrated, which engage annular grooves of the pins. Alternatively, the pins of the clamping jaws 13 can also be inserted by snap-on action in the openings of the legs of the pliers in a detachable way.

Figure 11:
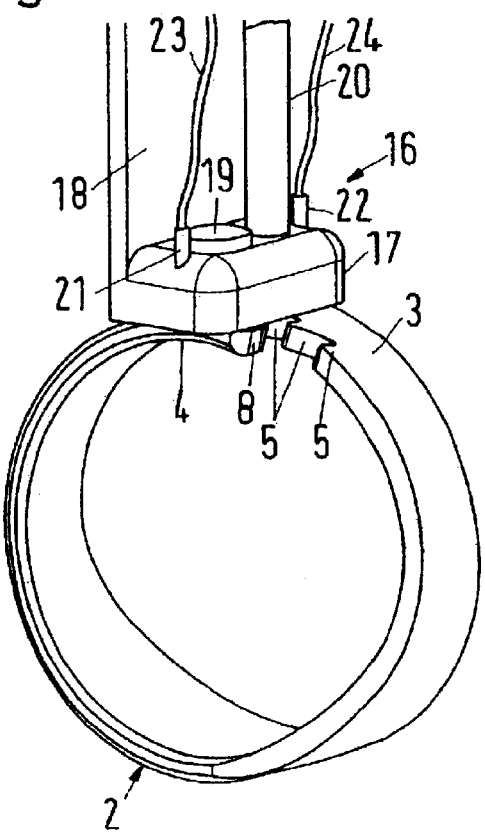
FIG. 11 shows a hose clamp according to the invention in the locked state and a device according to the invention for releasing the hose clamp connected to the hose clamp.

The release action can then be realized, as mentioned above, by means of a screwdriver 11 according to FIG. 5 or substantially automatically by means of the device 16 illustrated in FIG. 11.

As show in FIG. 11, the device 16 has a housing 17 with a holder 18 attached thereto. The magnet 19, preferably a permanent magnet, is provided in the housing 17 and has one pole projecting at the top from the housing 17. The magnet 19 extends so far through the housing 19 that the other pole is flush with the underside of the housing 17. Laterally adjacent to the magnet 19 a rod-shaped slide 20 is supported in the housing 17 so as to be slidable through it. The slide 20 forms the armature of a solenoid whose coil is not illustrated. The device 16 is radially outwardly positioned on the end sections 3 and 4 so that the magnet 19 secures the device 16 on one end section 4 and one end of the slide 20 only rests against the end section 3.

Axially relative to the spring band 2 and externally relative to the magnet 19 and the slide 20, a presence sensor 21 and 22 is provided in the housing 17, respectively. The detection range of the presence sensors is thus adjacent to the axially outer edges of the end sections 3, 4 of the spring band 2. The presence sensors 21 and 22 project also through the housing 17 so that they end axially outside of the end sections 3 and 4. They each have a sender-receiver for light waves, sound waves or electromagnetic waves. They act therefore as reflection sensors. The sender of each sensor 21, 22 is connected via a cable 23 and 24, respectively, with an electric current source, and the receiver of each sensor 21, 22 is connected by means of the same cable 23, 24 with an AND gate in a wiring arrangement which is mounted on the holder 18 but is not illustrated. The electric current source or supply is moreover connected to a coil of the solenoid actuating the slide 20, the coil being arranged in the wiring arrangement (circuit), so that upon receipt of a receiving signal by both sensors 21 and 22 the current supply to the coil is switched on.

However, the presence sensors 21 and 22 generate only a receiving signal when a signal emitted by them is reflected on a hose arranged in the spring band 2, i.e., a hose is present. Optionally, the slide 20 is forced radially against the end section 3 such that the end section 3 is forced radially inwardly thereby causing the teeth 5, 6 to become disengaged and the end sections 3, 4 to move by spring action axially away from one another, so that the spring band 2 then contracts tightly about the hose.

As an alternative, the slide 20 can be detachably connected to the end section 3, for example, in that it is hooked underneath a lateral projection on the end section 3. The end section 3 could then be radially outwardly pulled by the solenoid in order to be released.

According to a further modification, the release device is not magnetically but mechanically secured on the end section 4 in a detachable way. According to another embodiment, the slide 20 can be locked and released by the solenoid and is then manually moveable in the unlocked position.

The release device 16 ensures in this way that the release of the hose clamp in the spread-apart position with engaged teeth can be performed only when a hose is positioned within the hose clamp. The hose clamp thus cannot be accidentally released before it has been slipped onto a hose. In this way, it is ensured that the hose clamp cannot be accidentally released and freely thrown off at high speed due to the impulse resulting from the release of the spring force of the spring band 2 so that injuries to persons are prevented.

Figure 12:
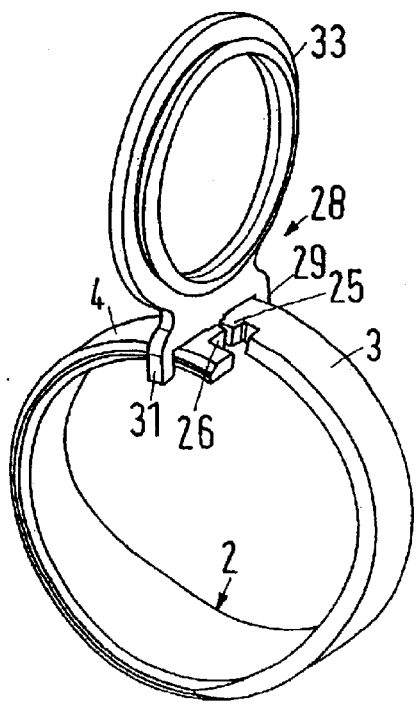
FIG. 12 is a modification of the hose clamp according to the invention showing rectangular teeth, wherein the end sections in the spread-apart position of the spring band are held together by a connecting member.
Figure 13:
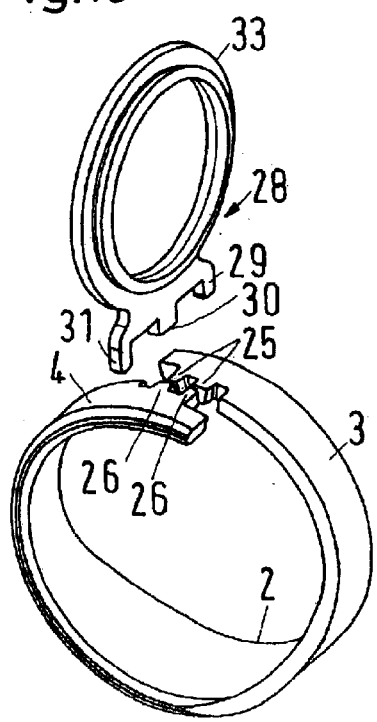
FIG. 13 shows the release of the hose clamp according to FIG. 12 by radial removal of the connecting member.

FIGS. 12 and 13 provide a further modification of the spring band clamp according to the invention. The end sections 3, 4 are provided with rectangular teeth 25 and 26 in place of the triangular teeth; these rectangular teeth are not engaged with one another. Instead, the end sections 3, 4 are held together in the spread-apart position of the spring band 2 by a connecting member 28 which has three parallel legs 29, 30, 31 in a single plane. The centrally arranged leg 30 projects into the oppositely positioned tooth gap between teeth 25 and 26 and the two other legs or teeth 29 and 31 rest against an axially outer edge of the end sections 3, 4. In this embodiment, spreading apart can also be realized by means of the pair of pliers 12 according to FIG. 10. For effecting the release, the connecting member 28 can be disengaged from the tooth gaps between the teeth 25, 26, as illustrated in FIG. 13. In order to facilitate pulling out the connecting member 28 from the tooth gaps, it is provided with an annular or ring-shaped grip 33.

Figure 14:
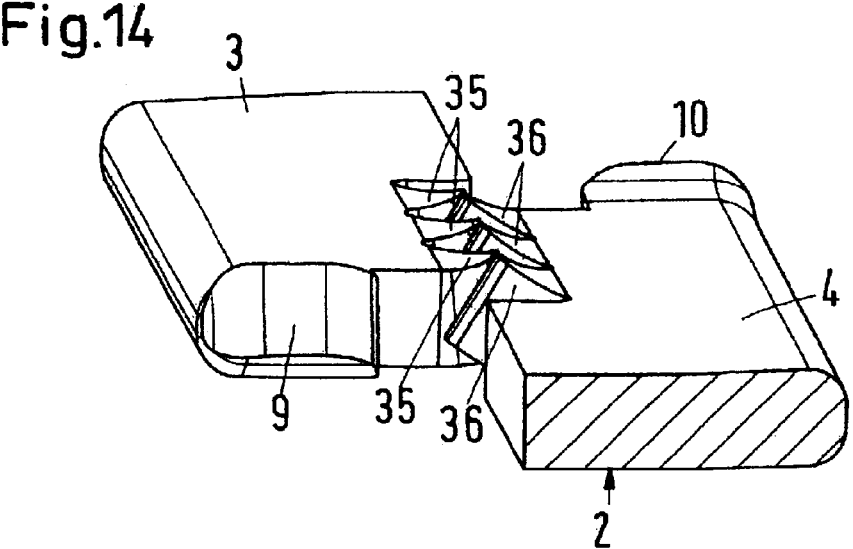
FIG. 14 shows a further modification of a hose clamp of FIGS. 1 through 3 according to the invention in the form of a section of the hose clamp in a perspective illustration.
Figure 15:
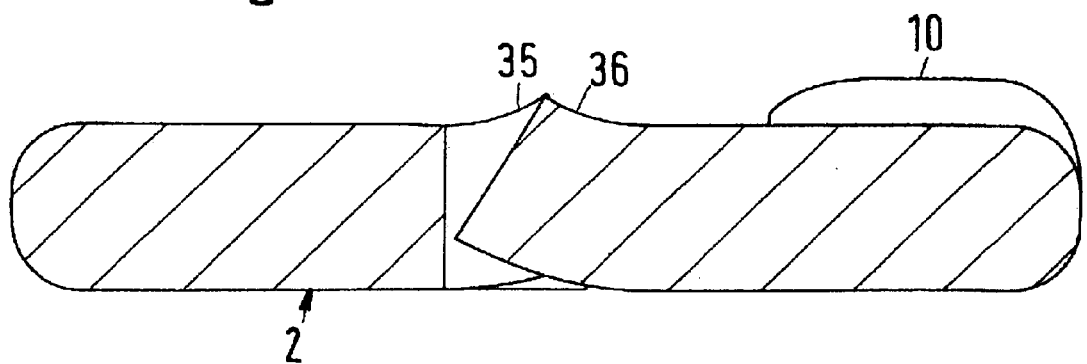
FIG. 15 shows a cross-section of the section of the hose clamp of FIG. 14.
Figure 16:
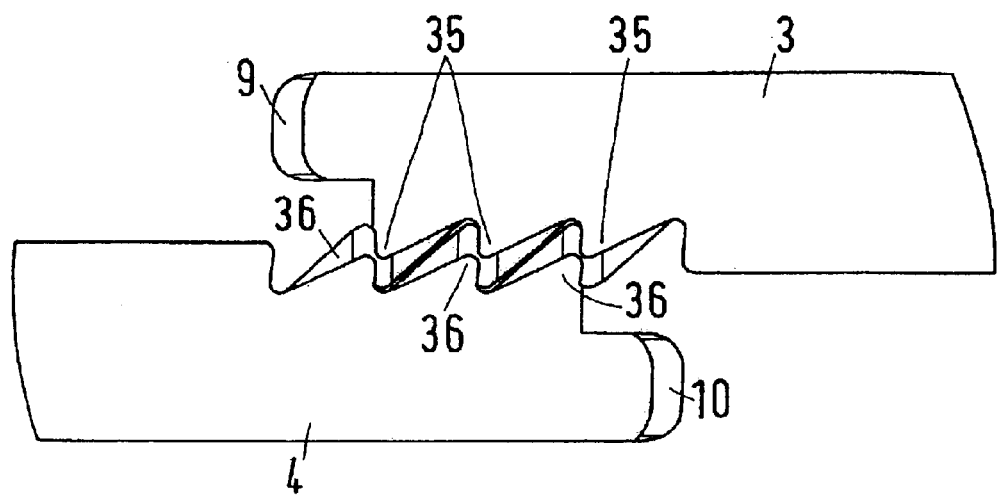
FIG. 16 shows a plan view onto the section of the hose clamp of FIG. 14.

FIGS. 14, 15, and 16 provide an additional modification of the hose clamp with triangular teeth 5, 6. In this embodiment, the teeth 5, 6 are bent in the radial direction of the host clamp so that they project partially past the circumference of the spring band 2. In this way, the radially inner edges of the teeth 5, 6 can be forced under the force of the spring band into the flanks of the neighboring teeth so that their accidental release in the axial direction of the hose clamp is made even more difficult.

The teeth of the embodiments of FIGS. 1 through 3 and 6 through 11 as well as the teeth 35, 36 of the embodiment of FIGS. 14 to 16 can be bent.

Also, it is possible to provide each end section 3, 4 with only one tooth 5, 6 instead of with several teeth when the hose clamp is to be spread apart only for realizing a single maximum permissible diameter.

While specific embodiments of the invention have been shown and described in detail to illustrate the inventive principles, it will be understood that the invention may be embodied otherwise without departing from such principles.

What is claimed is:

1. A hose clamp for clamping a hose on a pipe, the hose clamp comprising:
    a spring band bent to a ring shape and comprising end sections configured to positively lock one another in a locking position when the spring band is in a spread-apart position widened past a nominal diameter of a hose against a spring force of the spring band, wherein the locking position of the end sections is releasable such that the spring band contracts about the hose;
    wherein the end sections are positioned laterally adjacent to one another in an axial direction of the hose clamp and have a first edge and a second edge facing one another in the axial direction of the hose clamp;
    wherein the first and second edges have at least one laterally projecting tooth, respectively;
    wherein, in a radial view onto the hose clamp, the at least one tooth of the first and second edges is substantially triangular, respectively;
    wherein both of the flanks of the at least one tooth of the first and second edges are slanted toward a free end of the end section, respectively; and
    wherein the at least one tooth of the first edge in the spread-apart position of the spring band is adapted to engage the at least one tooth of the second edge by axially bending the end sections toward each other against the spring force of the spring band.

2. The hose clamp according to claim 1, wherein the at least one tooth of the first and second edges are bent in a radial direction of the hose clamp so that the at least one tooth projects past an annular periphery of the spring band, respectively.

3. A hose clamp for clamping a hose on a pipe, the hose clamp comprising:
    a spring band bent to a ring shape and comprising end sections configured to positively lock one another in a locking position when the spring band is in a spread-apart position widened past a nominal diameter of a hose against a spring force of the spring band, wherein the locking position of the end sections is releasable such that the spring band contracts about the hose;
    wherein the end sections are positioned laterally adjacent to one another in an axial direction of the hose clamp and have a first edge and a second edge facing one another in the axial direction of the hose clamp;
    wherein the first and second edges have at least one laterally projecting tooth, respectively,
    further comprising a connecting member holding the end sections together in the spread-apart position of the spring band, wherein the connecting member has three parallel legs,
    wherein a first one of the three legs projects into an opposed tooth gap and a second one and a third one of the three legs are pressed against an axially outer edge of the end sections.

4. The hose clamp according to claim 3, wherein, in a radial view onto the hose clamp, the at least one tooth of the first and second edges is rectangular, respectively.

5. The hose clamp according to claim 3, wherein the connecting member has a grip.

6. The hose clamps according to claim 5, wherein the grip is annular.

7. A release device for releasing a spread-apart hose clamp, the hose clamp comprising a spring band bent to a ring-shape and comprising end sections configured to positively lock one another in a locking position when the spring band is in a spread-apart position widened past a nominal diameter of a hose against a spring force of the spring band, wherein the locking position of the end sections is releasable such that the spring band contracts about the hose, wherein the end sections are positioned laterally adjacent to one another and have a first edge and a second edge facing one another in an axial direction of the hose clamp, wherein the first and second facing edges have at least one laterally projecting tooth, respectively; the release device adapted to be locked on the first one of the end sections and comprising:
    a slide and two presence sensors for detecting a presence of a hose in the hose clamp;
    wherein the slide is configured to engage, in a radial direction of the hose clamp, the second one of the end sections and wherein a detection range of the presence sensors is located adjacent to an axially outer edge of the first and second end sections and wherein a sliding movement of the slide, when a hose has been detected in the hose clamp by the presence sensors, is released by a certain amount and the second end section is entrained, wherein, after the slide has travelled the certain amount, the teeth of the first and second end sections are moved radially out of engagement.

8. The device according to claim 7, configured to magnetically lock on the first end section.

9. The device according to claim 7, wherein the slide is configured to be electromagnetically actuated.

10. A hose clamp for clamping a hose on a pipe, the hose clamp comprising:
    a spring band bent to a ring shape and comprising end sections configured to positively lock one another in a locking position when the spring band is in a spread-apart position widened past a nominal diameter of a hose against a spring force of the spring band, wherein the locking position of the end sections is releasable such that the spring band contracts about the hose;
    wherein the end sections are positioned laterally adjacent to one another in an axial direction of the hose clamp and have a first edge and a second edge facing one another in the axial direction of the hose clamp;
    wherein the first and second edges have at least one laterally projecting tooth, respectively;
    wherein both flanks of the at least one tooth of the first and second edges are slanted toward a free end of the end section, respectively;
    wherein each end section has a tooth-free section between a section of the end section having at least one tooth and the free end of the end section, and wherein the tooth-free section has a width narrower in the axial direction than a width of the section of the end section having the at least one tooth.

* * * * *